United States Patent [19]

Stotts et al.

[11] 4,128,300
[45] Dec. 5, 1978

[54] OPTICAL LOGIC ELEMENTS

[75] Inventors: Larry B. Stotts, Chula Vista; William E. Martin, Pleasonton; Paul S. Catano, San Diego, all of Calif.

[73] Assignee: The United States of America as represented by the Secretary of the Navy, Washington, D.C.

[21] Appl. No.: 836,265

[22] Filed: Sep. 26, 1977

[51] Int. Cl.² ............................................. G02B 5/14
[52] U.S. Cl. ................................................. 350/96.14
[58] Field of Search ..................................... 350/96.14

[56] References Cited

U.S. PATENT DOCUMENTS

| | | | |
|---|---|---|---|
| 3,909,108 | 9/1975 | Taylor | 350/96.14 |
| 3,995,311 | 11/1976 | Taylor | 350/96.14 |
| 4,070,094 | 1/1978 | Martin | 350/96.14 |

*Primary Examiner*—John K. Corbin
*Assistant Examiner*—Stewart Levy
*Attorney, Agent, or Firm*—R. S. Sciascia; G. J. Rubens; J. W. McLaren

[57] ABSTRACT

An improved optical element is provided by an arrangement of optical waveguides disposed with two photoconductive paths and a plurality of electrodes arranged to impress an electric field across the optical waveguide configuration and the photoconductive paths. Optical energy is fed into an input optical waveguide and, dependent upon the optical inputs to the first and second photoconductive paths, an output is produced by the optical waveguide configuration in the manner of a logic gate. Variant configuration of the optical waveguide assembly can be made to perform in the manner of an AND gate, and OR gate, an exclusive OR gate, a NOR gate, or a NAND gate; alternatively, combination configurations can simultaneously perform multiple logic functions.

12 Claims, 3 Drawing Figures

OPTICAL LOGIC ELEMENTS

BACKGROUND OF THE INVENTION

Electronic logic elements in a variety of forms have been devised, known, and used for a considerable length of time. While such electronic logic elements are widely used, they nonetheless have a number of inherent disadvantages. One of the prime disadvantages of electronic optical elements is that, as with all electron devices, they are subject to cross-talk, intermodulation interference, and all the other common types of electromagnetic interference phenomena.

Moreover, as with all electronic devices, electronically operative logic elements produce an electromagnetic field in the course of their operation and therefore their actuation is not entirely secure in a military sense because there operative actuation can be detected by interception of the electromagnetic fields thus created.

Perhaps one of the most important disadvantages of electronic logic elements is the fact that each logic function must be performed separately and sequentially; that is to say, that electronic logic elements, as known in the present state of the art, perform but one separate logic function and the requirement to perform a number of different logic functions cannot be realized in a single logic element but only in a number of separate, discrete logic elements each of which is specifically designed and configured to perform its own distinctly different logic function. This, of course, implies a time requirement because of the fact that sequential logic functions may have to be performed in order to arrive at a desired result.

Accordingly, it is highly desirable that a generalized combined logic element be provided, obviating the separate sequential logic functions as must be performed with electronic logic elements. Additionally, it is also desirable that the disadvantages of cross-talk, intermodulation, electromagnetic interference effects, etc., be obviated and that a militarily secure means be provided for performing logic functions.

Optical gating in the operation of an optical OR gate has been reported by A. M. Glass and T. J. Negran in Applied Physics Letters, Vol. 24, No. 2, Jan. 15, 1974, at pages 81 and 82. The optical OR gate described in that publication employs photovoltaic phenomena to perform optical logic in pyroelectric waveguides. The waveguide material is single crystal lithium tantalate and, while reasonably satisfactory results have apparently been obtained experimentally, only separate, discretely operative OR and AND gates have been reported. It is apparent therefore that this prior art technique is not adaptable to provide a generalized logic element which will perform multiple logic functions within the same device configuration. Accordingly, the Glass and Negran technique is subject to the same limitation as electronic logic elements which require separate logic elements to perform separate logic functions.

SUMMARY OF THE INVENTION

The present invention contemplates a generalized optical logic element capable of simultaneously performing a number of different logic functions by employing the combination of a particularized configuration of optical waveguides, two photoconductive paths, and a number of electrodes positioned to impress a dc electric field across the waveguides, photoconductive paths, and electrodes assembly. All these elements may be conveniently supported on a common substrate to provide a unitized integral structure.

In a preferred embodiment of the present invention the generalized optical logic element comprises an input optical waveguide for transmitting single mode optical energy which diverges into first and second single mode optical waveguide branches of equal optical length and reconverging at a multi-mode optical waveguide.

First, second, and third optical waveguides connecting in common to the multi-mode optical waveguide are provided for propagating lowest order, first order, and second order modes of light energy, respectively.

First and second photoconductive paths, which are responsive to light energy to change their conductivity, are disposed outside and spaced from the first and second single mode optical waveguide branches.

A grounded electrode is positioned between the first and second single mode optical waveguide branches and an additional electrode is positioned between the first single mode optical waveguide branch and the first photoconductive path, and another additional electrode is positioned between the second single mode optical waveguide branch and the second photoconductive path.

A means is provided for impressing a dc electric field across the described assembly of optical waveguide branches, photoconductive paths, and electrodes. Such means may comprise two additional electrodes laterally encompassing the entire assembly and connected to a suitable source of dc potential.

A constant light energy signal is received at the input optical waveguide. The logic element inputs are received at the two photoconductive paths. When light energy is received on both the photoconductive paths, an output will appear only at the third output optical waveguide which is capable of exclusively propagating the second order mode of light energy; an output from the third output optical waveguide indicates that the optical logic element is functioning in the manner of an AND gate.

When light energy is impressed at the input to either one of the two photoconductive paths, an output will appear at the second output optical waveguide which is capable of exclusively propagating only the first order mode of light energy; such output from the second output optical waveguide indicates that the optical logic element is operating in the manner of an exclusive OR gate.

When no light energy is impressed at the inputs of the first or second photoconductive paths, an output will appear at the first output optical waveguide which exclusively propagates the lowest order mode of light energy; such output thereby indicates that the optical logic element is functioning in the manner of a NOR gate.

Accordingly, one form of the generalized optical logic element of the present invention is capable of simultaneously functioning as an AND gate, an exclusive OR gate, or a NOR gate.

Alternatively, by providing first and second optical waveguides connecting in common to a first multi-mode optical waveguide for propagating the lowest order and first order modes of light energy, respectively, and adding a second multi-mode optical waveguide connected to receive the light energy propagated by the first and second optical waveguides, the optical logic element of the present invention is additionally made to function in the manner of a NAND gate, as well as an AND gate, an OR gate, or a NOR gate.

In addition, by providing second and third optical waveguides connecting in common to a first multi-mode optical waveguide for propagating the first and second order modes of light energy, respectively, and adding a second multi-mode optical waveguide connected to receive the light energy propagated by the second and third waveguides, the optical logic element of the present invention is made to function in the manner of an OR gate, as well as an AND gate, an exclusive OR gate, a NOR gate, or a NAND gate.

Accordingly, it is a primary object of the present invention to provide an improved generalized optical logic element capable of simultaneously performing a number of different logic functions.

Another most important object of the present invention is to provide an optical logic element which obviates many of the inherent disadvantages of functionally comparable electronic elements.

A further object of the present invention is to provide a logic element which is not subject to cross-talk intermodulation or other electromagnetic interference effects.

Yet another most important object of the present invention is to provide a generalized optical logic element which has high speed operative response in order to optimize the advantage of its simultaneous operation in performing multiple logic operations.

A further object of the present invention is to provide an improved optical logic element which is relatively simple and inexpensive to fabricate.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
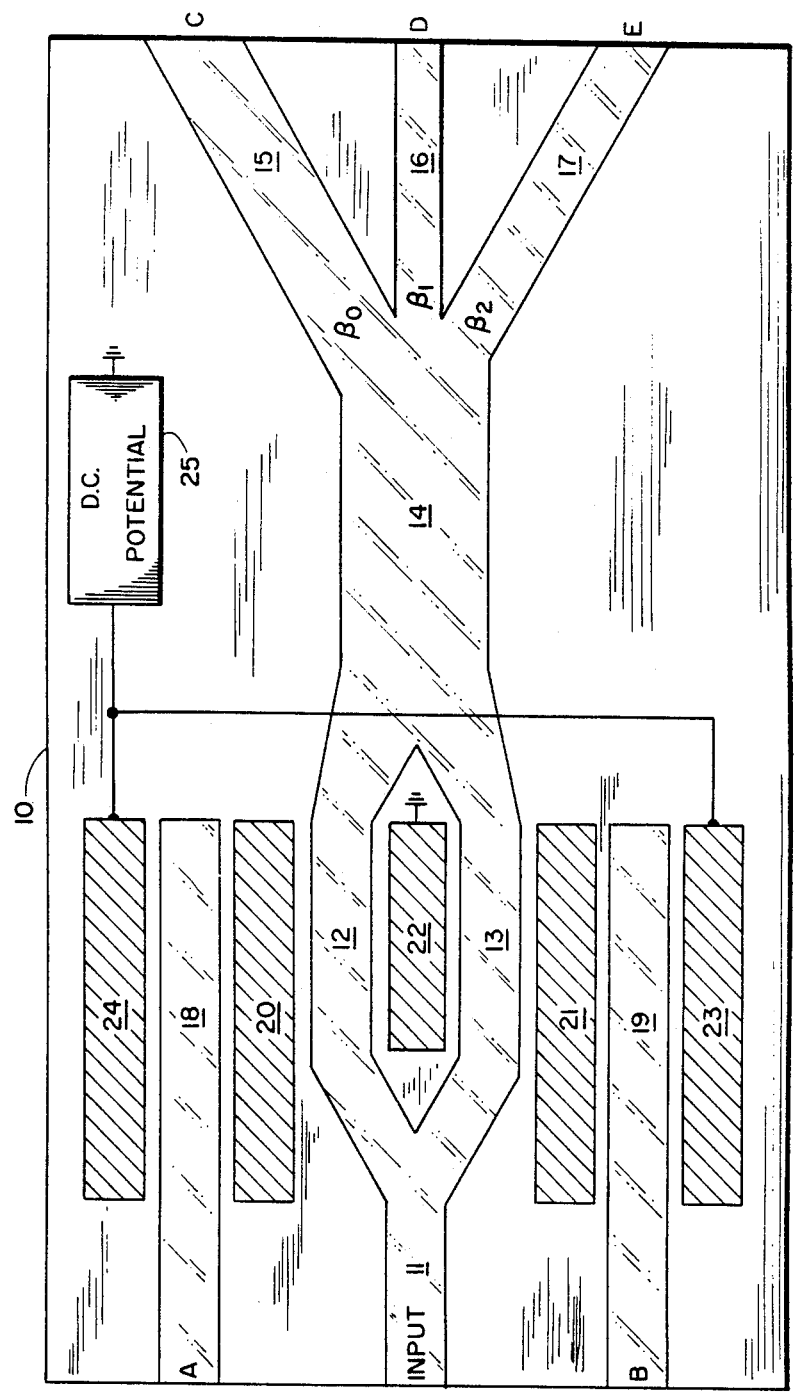
FIG. 1 is a greatly enlarged representation of a preferred embodiment of the present invention for performing multiple logic functions.

A preferred embodiment of the present invention as illustrated in FIG. 1 advantageously provides a substrate 10 of suitable material supporting all the elements of the generalized optical logic element on an integrated structure. An input optical waveguide 11, which is designed for transmitting single mode optical energy, diverges into a first single mode optical waveguide branch 12 and a second single mode optical waveguide branch 13. The first and second single mode optical waveguide branches 12 and 13 are of equal optical length and reconverge at a multi-mode optical waveguide 14.

A plurality of output optical waveguides 15, 16, and 17 are connected in common to the multi-mode optical waveguide 14. The output optical waveguide 15 propagates only the lowest order mode of light energy; the output optical waveguide 16 propagates only the first order mode of light energy, and the output optical waveguide 17 propagates only the second order modes of light energy.

A first photoconductive path 18 is laterally disposed and spaced from the first optical waveguide branch 12, while a second photoconductive path 19 is laterally disposed and spaced from the second single mode optical waveguide branch 13.

An electrode 20 is positioned between the first single mode optical waveguide branch 12 and the first photoconductive path 18 while another electrode 21 is positioned between the second single mode optical waveguide branch 13 and the second photoconductive path 19; a grounded electrode 22 is positioned between the two single mode optical waveguide branches 12 and 13.

A means is also provided for impressing a dc electric field across the previously described and illustrated assembly of optical waveguide branches, photoconductive paths, and electrodes. Such means may comprise two additional electrodes 23 and 24 laterally disposed outside the assembly and connected to a suitable source of dc potential 25.

OPERATION

In the embodiment illustrated in FIG. 1, light energy of mode velocity $\beta$ introduced into the input optical waveguide 11 divides equally between the two single mode optical waveguide branches 12 and 13. In the absence of light energy in the photoconductive paths 18 and 19, the electric field impressed across the assembly by the connection of electrodes 23 and 24 to a source of dc potential 25 is equally distributed and therefore the light propagating along the two single mode optical waveguide branches 12 and 13 travels the same optical distance. Accordingly, at the reconvergence the light energies are in phase; therefore, the resultant light energy propagating along the multi-mode optical waveguide 14 is of the same character as the original light energy introduced into the assembly which has been recombined through constructive interference to produce the lower order mode of light energy, $\beta_0$. Since waveguide 15 is designed and adapted to exclusively propagate the lowest order light energy $\beta_0$, an output will be produced by optical waveguide 15 indicating that there is no input to photoconductive path 18, nor any input to photoconductive path 19. The configuration is therefore operative as a NOR gate.

When an electric field is applied transversely across the optical waveguides a small change in refractive index is given effect for the transverse electric (TE) and transverse magnetic (TM) polarized modes which may be expressed by the relationships $$\Delta n_{TE} = \frac{n^3}{2} E S_{TE} \quad (1)$$

$$\Delta n_{TM} = \frac{n^3}{2} E S_{TM} \quad (2)$$

where $n$ = index of refraction of the crystal $S_{TE}$, $S_{TM}$ = electro-optic coefficient defined by the specific type and orientation of crystal used.

If it is assumed that $S_{TE} = S_{TM} = S$ the resulting phase shift induced in light propagating along the optical waveguide subjected to the electric field may be expressed as $$\Delta \psi = \frac{2\pi}{\lambda} \frac{n^3}{2} S E l \quad (3)$$

If different electric fields are impressed across two optical waveguides propagating substantially the same light energy the resulting phase difference induced between the light energy propagating along the two waveguides may be expressed as $$\Delta \psi = \frac{2\pi}{\lambda} n^2 S E l \quad (4)$$

When there is a light energy input to either photoconductive path will lower the resistivity between the high potential electrode contiguous to it and the adjacent electrode laterally disposed between one of the two single mode optical waveguide branches.

For example, if light energy is introduced only into the photoconductive path 18, the resistivity between electrode 24 and 20 will be reduced due to the higher conductivity of the photoconductive path 18. The voltage drop across electrodes 24 and 20 will thereby be less, impressing a relatively greater dc potential across electrode 20 and the grounded electrode 24. This has a commensurate effect upon the refractive index of the single mode optical waveguide branch 12. Accordingly, single mode optical light energy propagating along optical waveguide branch 12 is propagated at a different velocity than that propagating along the single mode optical waveguide branch 13 because of the difference in the electric fields impressed across the single mode optical waveguide branches 12 and 13.

As a consequence, a relative phase shift occurs producing a different type of interference between the light emerging from the two optical waveguide branches 12 and 13 at their reconvergence in the multi-mode optical waveguide 14. Such interference is partially destructive and produces a first order mode of light energy, $\beta_1$. Since optical waveguide 16 is designed and configured to exclusively propagate light energy of first order mode, an output will be produced by optical waveguide 16 indicating an exclusive OR input to the optical logic element.

Similarly, when light energy is introduced into photoconductive path 19, the resistivity between electrode 23 and 21 is changed producing a relatively higher dc potential across electrodes 21 and 24, a change of electric field and having a commensurate effect upon the refractive index of the single mode optical waveguide branch 13. Assuming that no light energy is introduced into photoconductive path 18, an operation takes place which is the converse of that previously described and the optical energy propagating along the single mode optical waveguide branches 12 and 13 destructively interfers at their reconvergence, producing a first order mode of light energy $\beta_1$ in the multi-mode optical waveguide 14 in a manner similar to that previously described. Optical waveguide 16 which is designed and configured to exclusively propagate optical energy of the first order mode, produces an output, indicative in the manner of an exclusive OR gate that light energy has been introduced into one or the other of the two photoconductive paths 18 or 19.

In a further mode of operation when light is introduced into both of the photoconductive paths 18 and 19 the refractive indices of both the single mode optical waveguide branches 12 and 13 is changed so that destructive interference is produced by the reconverging light energy propagating through the branches producing second mode optical energy $\beta_2$ in the multi-mode optical waveguide 14. The second mode light energy propagating along the multi-mode optical waveguide 14 is propagated only along the optical waveguide 17 since it is characterized as being configured and designed only to propagate second mode light energy. An output is accordingly produced by the output optical waveguide 17 indicating that inputs are present at both the photoconductive path 18 and 19 and the optical logic element of FIG. 1 is operating in the mode of an AND logic gate.

If the photoconductive paths 18 and 19 are labeled A and B, and output optical waveguides 15, 16 and 17 are labeled C, D, and E as shown in FIG. 1, a truth table may be developed summarizing the described operation of the optical logical element as follows:

| A | B | C | D | E |
|---|---|---|---|---|
| 0 | 0 | 1 | 0 | 0 |
| 0 | 1 | 0 | 1 | 0 |
| 1 | 0 | 0 | 1 | 0 |
| 1 | 1 | 0 | 0 | 1 | where
  0 = absence of light in the respective photoconductive path or output optical waveguide.
  1 = presence of light in the respective photoconductive path or output optical waveguide.

Figure 2:
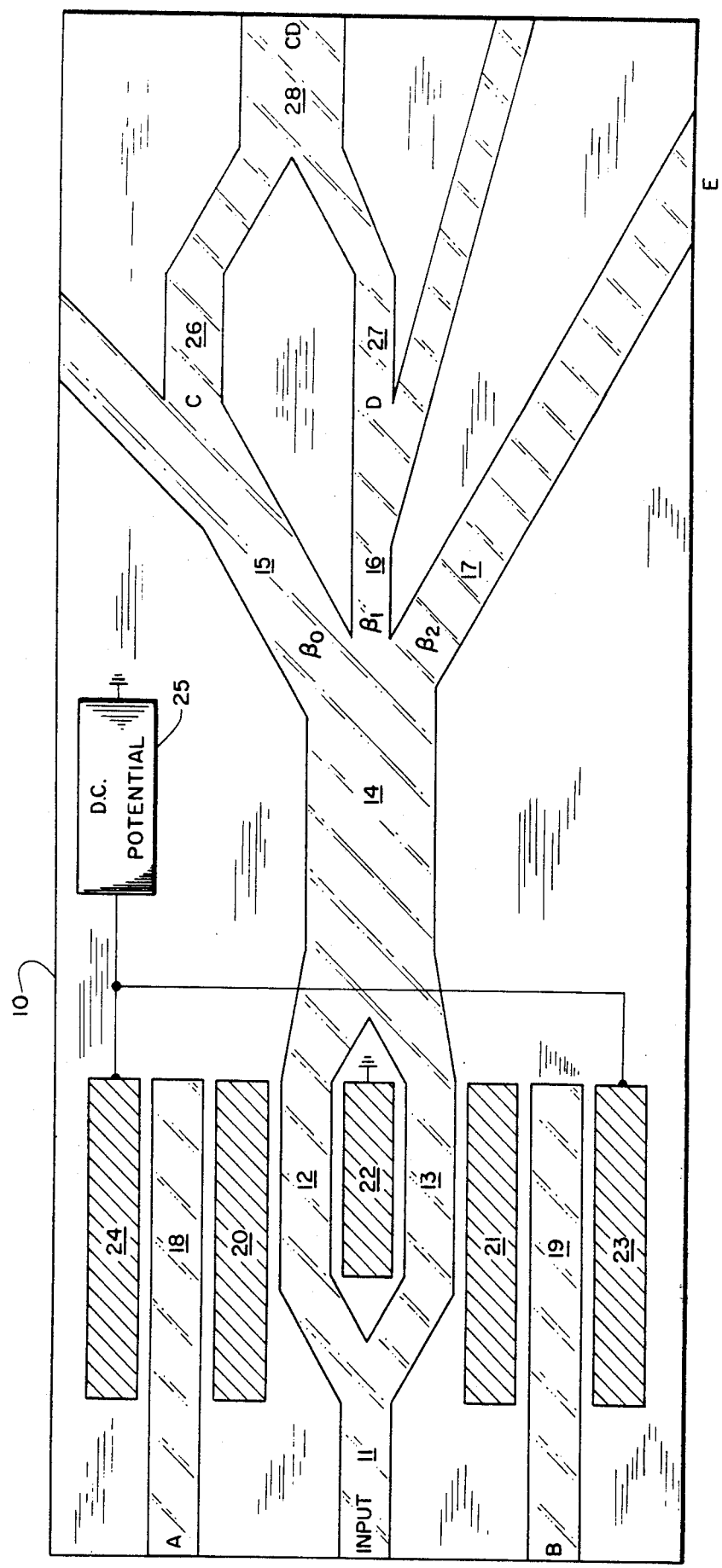
FIG. 2 is a variant configuration of the present invention designed to additionally perform as a NAND gate.

FIG. 2 shows a variant embodiment of the present invention which enables the optical logical element concept to be extended to include NAND gate operation. In the illustration of FIG. 2 like elements bear the same numerical designation as in FIG. 1; however, optical waveguides 26, 27, and 28 have been added to the structure.

Optical waveguides 26 and 27 are essentially extensions of optical waveguides 15 and 16 and are similarly characterized as propagating lowest order and first order modes of light energy, respectively. Additionally, optical waveguides 26 and 27 converge at a second multi-mode optical waveguide 28. This configuration operates in the manner of a NAND gate; that is to say, that there will be a light energy output from the multi-mode optical waveguide 28 if there is an absence of light energy propagating along either optical waveguide 26 or optical waveguide 27, but there will be an absence of light energy output from multi-mode optical waveguide 28 when there is light energy propagating along both optical waveguides 26 and 27.

Figure 3:
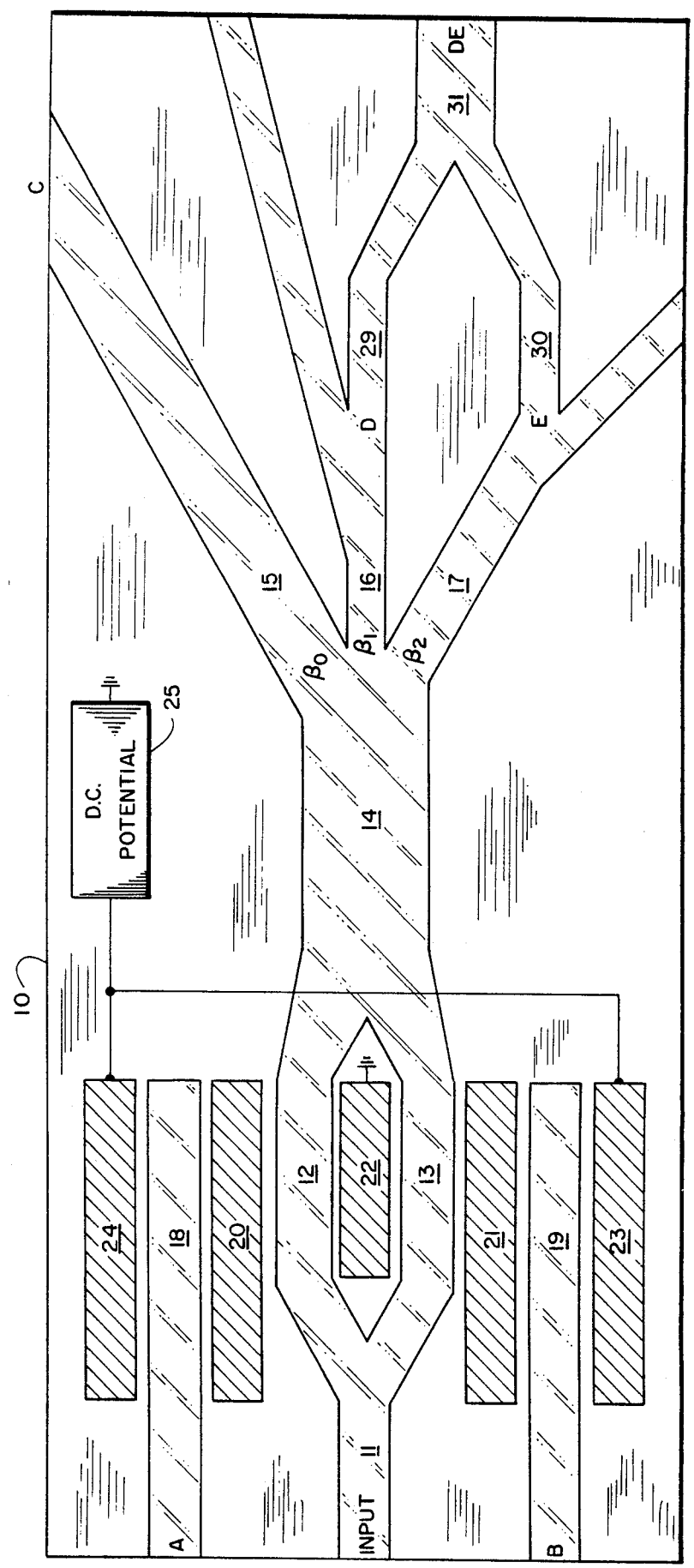
FIG. 3 is a variant configuration of the present invention designed to additionally perform as an OR gate.

FIG. 3 illustrates a configuration of the present invention which functions as an OR gate. Comparable elements in FIG. 3 bear the same numerical designations as in FIG. 1. Optical waveguides 29, 30, and 31 have been added to the configuration of FIG. 1.

Optical waveguide 29 which is essentially an extension of optical waveguide 16 is characterized as propagating first order modes of light energy while optical waveguide 30, an extension of optical waveguide 17, is characterized as propagating second order modes of light energy.

The optical waveguides 29 and 30 converge at a second multi-mode optical waveguide 31. The configuration of FIG. 3 operates as an OR gate as contrasted to exclusive OR gate operation. When there is optical energy input to either photoconductive path 18, or photoconductive path 19, or both photoconductive paths, an output will be produced at multi-mode optical waveguide 31. This is in contrast to the exclusive OR gate operation of FIG. 1 where the input must be exclusively to photoconductive path 18 or photoconductive path 19 in order to produce an output.

Accordingly, the concept of the present invention embodies a configuration which will operate in the manner of a NAND gate, and an OR gate in addition to operating as a NOR gate, an exclusive OR gate, or an AND gate.

Those knowledgeable and skilled in the pertinent prior arts will readily and wholly appreciate that the present invention provides a generalized optical logic element which can simultaneously function to perform different and distinct logic operations.

This simultaneous operation was not true of known electronic logic elements since each was independently operative. Consequently, if a number of logic operations were required to be performed by means of prior art electronic logic gates, the logic operations would have to be done in sequence rather than simultaneously.

An understanding of the present invention where, for instance, simultaneous logic operations can be performed providing the functions of a NAND gate, a NOR gate, an OR gate and an AND gate all in the same generalized configuration as shown in FIG. 2, conclusively establishes an outstanding advantage of this innovative concept in both speed and effectiveness of operation.

Moreover, the present invention is simple to fabricate and virtually immune to electromagnetic interference in the form of cross-talk or intermodulation.

Additionally, the concept of the present invention is such that it desirably lends itself to fabrication by less expensive means than is true of functionally comparable electronic gates and such simplified and relatively inexpensive fabrication may be accomplished without sacrificing inherent speed of operation.

Obviously many modifications and variations of the present invention are possible in the light of the above teachings. It is therefore to be understood that within the scope of the appended claims the invention may be practiced otherwise than as specifically described.

What is claimed is:

1. An optical logic element comprising:
   an input optical waveguide for transmitting single mode optical energy, and diverging into first and second single mode optical waveguide branches of equal optical length which reconverge at a multi-mode optical waveguide;
   first, second, and third output optical waveguides connecting in common to said multi-mode optical waveguide for propagating lowest order, first order and second order modes of light energy, respectively;
   first and second photoconductive paths disposed outside and spaced from said first and second single mode optical waveguide branches, respectively;
   a grounded electrode positioned between said first and second single mode optical waveguide branches;
   an electrode positioned between said first single mode optical waveguide branch and said first photoconductive path;
   an electrode positioned between said second single mode optical waveguide branch and said second photoconductive path; and
   means for impressing a dc electric field across said optical waveguide branches, photoconductive paths, and electrodes.

2. An optical logic element as claimed in claim 1 wherein said optical waveguides, photoconductive paths, and electrodes are supported on a common substrate.

3. An optical logic element as claimed in claim 1 wherein said input optical waveguide diverges into parallel first and second single mode optical waveguide branches.

4. An optical logic element as claimed in claim 3 wherein said parallel first and second single mode optical waveguide branches are co-extensive.

5. An optical logic element as claimed in claim 1 wherein said first and second photoconductive paths are disposed in parallel relationship to each other.

6. An optical logic element as claimed in claim 5 wherein said photoconductive paths are parallel to said first and second single mode optical waveguide branches.

7. An optical logic element as claimed in claim 1 wherein said means for impressing a dc electric field across the assembly of said optical waveguide branches, photoconductive paths, and electrodes comprises additional electrodes laterally disposed to encompass said assembly and connected to a source of dc potential.

8. An optical NOR gate comprising:
   an input optical waveguide for transmitting single mode optical energy and diverging into first and second single mode optical waveguide branches which reconverge for providing optical paths of equal optical length;
   an output optical waveguide for propagating only lowest order mode of light energy and connected to receive the light energy propagated by said first and second single mode optical waveguide branches;
   first and second photoconductive paths disposed outside and spaced from said first and second single mode optical waveguide branches, respectively;
   a grounded electrode positioned between said first and second single mode optical waveguide branches;
   an electrode positioned between said first single mode optical waveguide branch and said first photoconductive path;
   an electrode positioned between said second single mode optical waveguide branch and said second photoconductive path; and
   means for impressing a dc electric field across said optical waveguide branches, photoconductive paths, and electrodes.

9. An optical exclusive OR gate comprising:
   an input optical waveguide for transmitting single mode optical energy and diverging into first and second single mode optical waveguide branches which reconverge for providing optical paths of equal optical length;
   an output optical waveguide for propagating only first order mode of light energy and connected to receive the light energy propagated by said first and second single mode optical waveguide branches;
   first and second photoconductive paths disposed outside and spaced from said first and second single mode optical waveguide branches, respectively;

a grounded electrode positioned between said first and second single mode optical waveguide branches;

an electrode positioned between said first single mode optical waveguide branch and said first photoconductive path;

an electrode positioned between said second single mode optical waveguide branch and said second photoconductive path; and means for impressing a dc electric field across said optical waveguide branches, photoconductive paths, and electrodes.

10. An optical AND gate comprising:

an input optical waveguide for transmitting single mode optical energy and diverging into first and second single mode optical waveguide branches which reconverge for providing optical paths of equal optical length;

an output waveguide for propagating only second order mode of light energy and connected to receive the light energy propagated by said first and second single mode optical waveguide branches;

first and second photoconductive paths disposed outside and spaced from said first and second single mode optical waveguide branches, respectively;

a grounded electrode positioned between said first and second single mode optical waveguide branches;

an electrode positioned between said first single mode optical waveguide branch and said first photoconductive path;

an electrode positioned between said second single mode optical waveguide branch and said second photoconductive path; and means for impressing a dc electric field across said optical waveguide branches, photoconductive paths, and electrodes.

11. An optical NAND gate comprising:

an input optical waveguide for transmitting single mode optical energy, and diverging into first and second single mode optical waveguide branches of equal optical length which reconverges at a first multi-mode optical waveguide;

first and second optical waveguides connecting in common to said first multi-mode optical waveguide for propagating lowest order and first order modes of light energy, respectively;

a second multi-mode optical waveguide connected to receive the light energy propagated by said first and second optical waveguides;

first and second photoconductive paths disposed outside and spaced from said first and second single mode optical waveguide branches, respectively;

a grounded electrode positioned between said first and second single mode optical waveguide branches;

an electrode positioned between said first single mode optical waveguide branch and said first photoconductive path;

an electrode positioned between said second single mode optical waveguide branch and said second photoconductive path; and means for impressing a dc electric field across said optical waveguide branches, photoconductive paths, and electrodes.

12. An optical OR gate comprising:

an input optical waveguide for transmitting single mode optical energy, and diverging into first and second single mode optical waveguide branches of equal optical length which reconverge at a first multi-mode optical waveguide;

first and second optical waveguides connecting in common to said first multi-mode optical waveguide for propagating first order and second order modes of light energy, respectively;

a second multi-mode optical waveguide connected to receive the light energy propagated by said first and second optical waveguides;

first and second photoconductive paths disposed outside and spaced from said first and second single mode optical waveguide branches, respectively;

a grounded electrode positioned between said first and second single mode optical waveguide branches;

an electrode positioned between said first single mode optical waveguide branch and said first photoconductive path;

an electrode positioned between said second single mode optical waveguide branch and said second photoconductive path; and means for impressing a dc electric field across said optical waveguide branches, photoconductive paths, and electrodes.

* * * * *